United States Patent
Paradis et al.

(10) Patent No.: US 10,119,470 B2
(45) Date of Patent: Nov. 6, 2018

(54) SHAFT ASSEMBLY OF A GAS TURBINE ENGINE AND METHOD OF CONTROLLING FLOW THEREIN

(71) Applicant: PRATT & WHITNEY CANADA CORP., Longueuil (CA)

(72) Inventors: Vincent Paradis, Longueuil (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/724,729

(22) Filed: Oct. 4, 2017

(65) Prior Publication Data

US 2018/0023476 A1  Jan. 25, 2018

Related U.S. Application Data

(62) Division of application No. 14/230,789, filed on Mar. 31, 2014, now Pat. No. 9,803,550.

(51) Int. Cl.

| G01F 1/42 | (2006.01) |
|---|---|
| F02C 7/18 | (2006.01) |
| F02C 9/18 | (2006.01) |
| F01D 5/08 | (2006.01) |
| F15D 1/02 | (2006.01) |

(52) U.S. Cl.
CPC ............... *F02C 7/18* (2013.01); *F01D 5/085* (2013.01); *F02C 9/18* (2013.01); *H05K 999/99* (2013.01); *F15D 1/025* (2013.01)

(58) Field of Classification Search
CPC ............................. F16L 55/027; F15D 1/025
USPC ................................................ 138/39, 42, 44
See application file for complete search history.

(56) References Cited

U.S. PATENT DOCUMENTS

| 2,190,357 A | * | 2/1940 | Ginter ..................... F16N 21/04 |
| | | | 138/44 |
| 2,501,593 A | * | 3/1950 | Becker .................... F16L 55/00 |
| | | | 138/44 |
| 2,604,958 A | * | 7/1952 | Leufvenius ............. F16N 21/02 |
| | | | 138/41 |
| 4,171,209 A | * | 10/1979 | Brown .................... B01D 46/10 |
| | | | 138/41 |
| 4,426,213 A | * | 1/1984 | Stavropoulos ............ F16T 1/34 |
| | | | 138/41 |
| 5,123,452 A | * | 6/1992 | LeBlanc ................... F16T 1/34 |
| | | | 138/41 |

(Continued)

*Primary Examiner* — Patrick F Brinson
(74) *Attorney, Agent, or Firm* — Norton Rose Fulbright Canada LLP

(57) ABSTRACT

A gas turbine engine comprises a shaft assembly including a hollow shaft of the gas turbine engine and a plug connected to the inlet end of the shaft. The hollow shaft has a shaft bore having a bore diameter. The hollow shaft has an inlet end for receiving a first portion of an incoming air flow. The plug has a plug bore therethrough, and an inlet end having an inlet diameter. The inlet diameter of the plug is smaller than the bore diameter. The plug includes a deflection surface adapted to deflect a second portion of the incoming air flow away from the shaft bore. A plug for connecting to an end of a hollow shaft of a gas turbine engine and s method of controlling a flow of fluid through a shaft having a bore therethrough of a gas turbine engine are also presented.

9 Claims, 5 Drawing Sheets

(56) References Cited

U.S. PATENT DOCUMENTS

| | | | |
|---|---|---|---|
| 5,315,859 A * | 5/1994 | Schommer | E03C 1/08 73/1.25 |
| 6,357,483 B1 * | 3/2002 | Kobayashi | E03C 1/08 138/40 |
| 7,258,524 B2 | 8/2007 | Friedel et al. | |
| 8,215,919 B2 | 7/2012 | Jewess et al. | |
| 8,549,865 B2 | 10/2013 | Thiyagarajan et al. | |
| 8,567,445 B2 * | 10/2013 | Schwartz | E03C 1/021 137/385 |
| 9,803,550 B2 * | 10/2017 | Paradis | F02C 7/18 |
| 2013/0071229 A1 | 3/2013 | Rejman | |

* cited by examiner

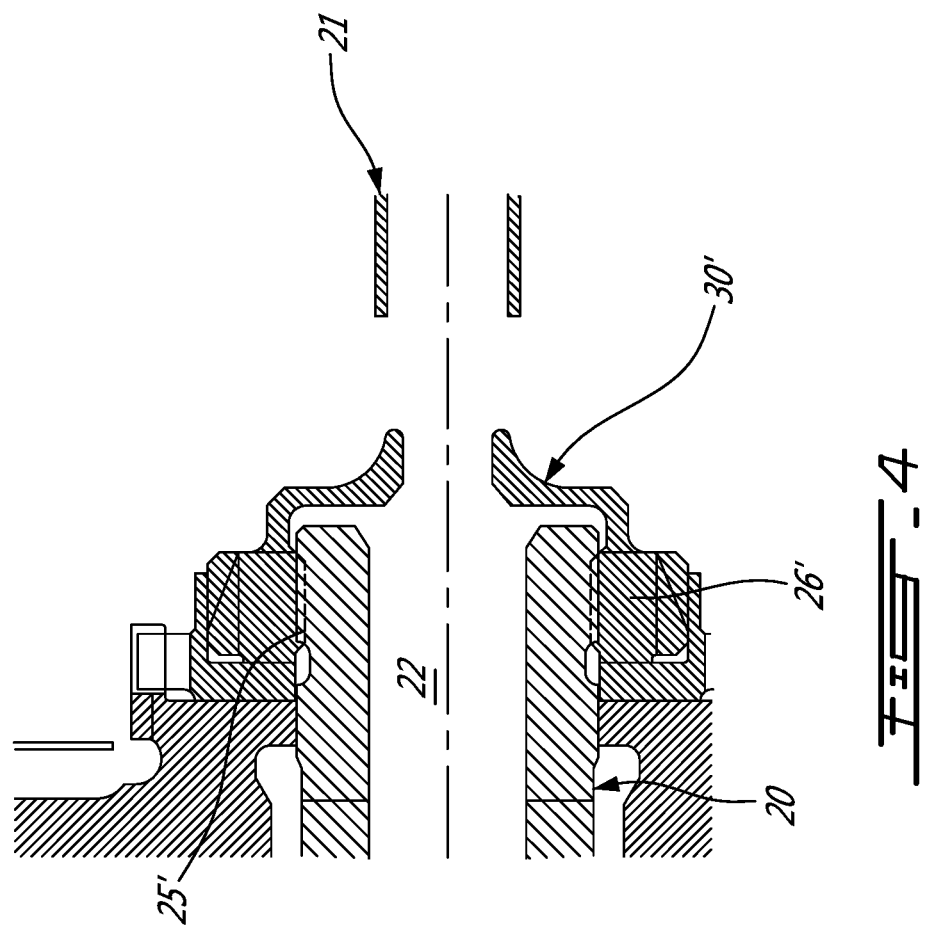

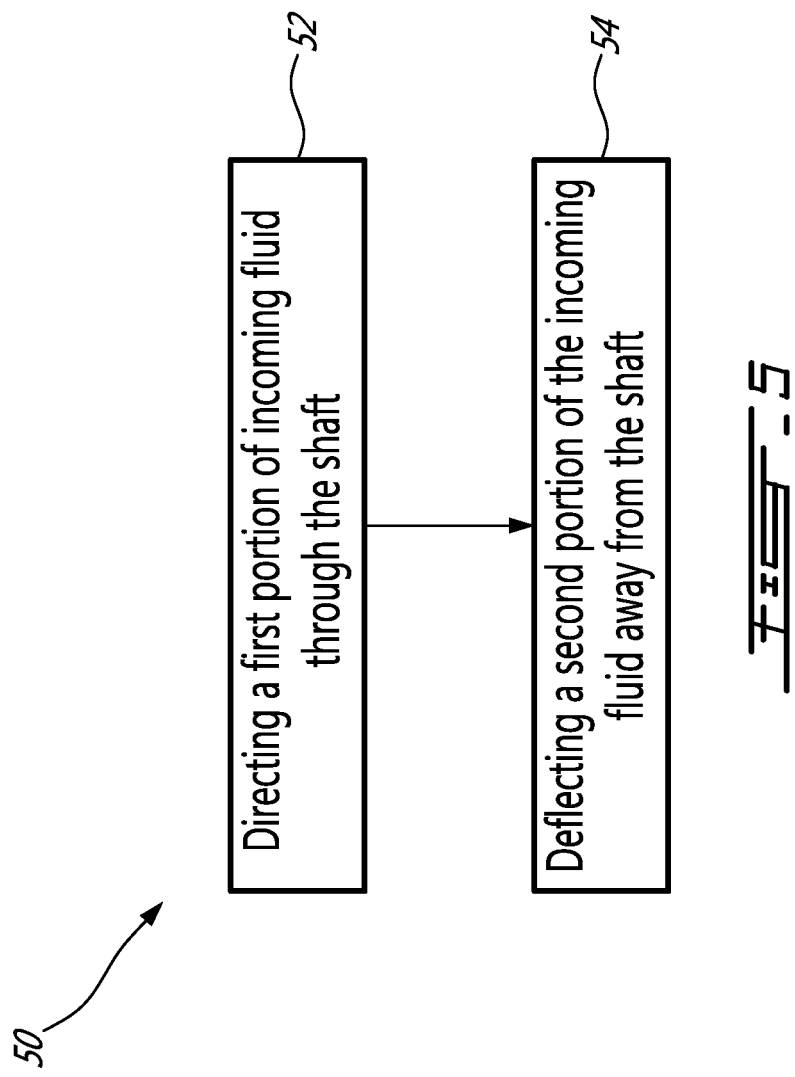

SHAFT ASSEMBLY OF A GAS TURBINE ENGINE AND METHOD OF CONTROLLING FLOW THEREIN

CROSS-REFERENCE TO RELATED APPLICATION

The present application is a divisional application of U.S. patent application Ser. No. 14/230,789 filed on Mar. 31, 2014, incorporated herein by reference.

TECHNICAL FIELD

The application relates generally to gas turbine engines and, more particularly, to cooling of shafts of gas turbine engines.

BACKGROUND OF THE ART

Gas turbine engines includes hot sections and cold sections. Cold air from the cold sections may be used to cool components of the gas turbine engine in a vicinity of the hot section, or components which may heat up during their use. To enable cooling, the cold air is redirect toward these components. In some cases, the cool air needs to be shared between components. Some components may receive more air than needed while other may not receive enough.

SUMMARY

In one aspect, there is provided a gas turbine engine comprising: a shaft assembly comprising: a hollow shaft of the gas turbine engine, the hollow shaft having a shaft bore having a bore diameter, the hollow shaft having an inlet end for receiving a first portion of an incoming air flow; and a plug connected to the inlet end of the shaft, the plug having a plug bore therethrough, the plug having an inlet end having an inlet diameter, the inlet diameter of the plug being smaller than the bore diameter, the plug including a deflection surface adapted to deflect a second portion of the incoming air flow away from the shaft bore.

In another aspect, there is provided a plug for connecting to an end of a hollow shaft of a gas turbine engine, the plug comprising: a plug body having a first end and a second end, the first end being adapted to be connected to the hollow shaft; a bore extending through the body from the first end to the second end, the first end having a first inner diameter larger than a second inner diameter of the second end; and a flaring deflection surface disposed on an outer surface of the plug body between the first end and the second end.

In a further aspect, there is provided a method of controlling a flow of fluid through a shaft having a bore therethrough of a gas turbine engine, the method comprising: allowing a first portion of an incoming flow through an inlet of a hollow plug connected to the shaft, the inlet having a diameter smaller than a diameter of the bore of the hollow shaft; and directing a second portion of the incoming flow away from the shaft via a deflection surface of the plug.

DESCRIPTION OF THE DRAWINGS

Reference is now made to the accompanying figures in which:

FIG. 4 is a schematic of the portion of the gas turbine engine of FIG. 2 shown with a second embodiment of the control plug; and FIG. 5 is a flow chart of method of controlling fluid flow using the plug of any of FIGS. 2 to 4.

DETAILED DESCRIPTION

Figure 1:
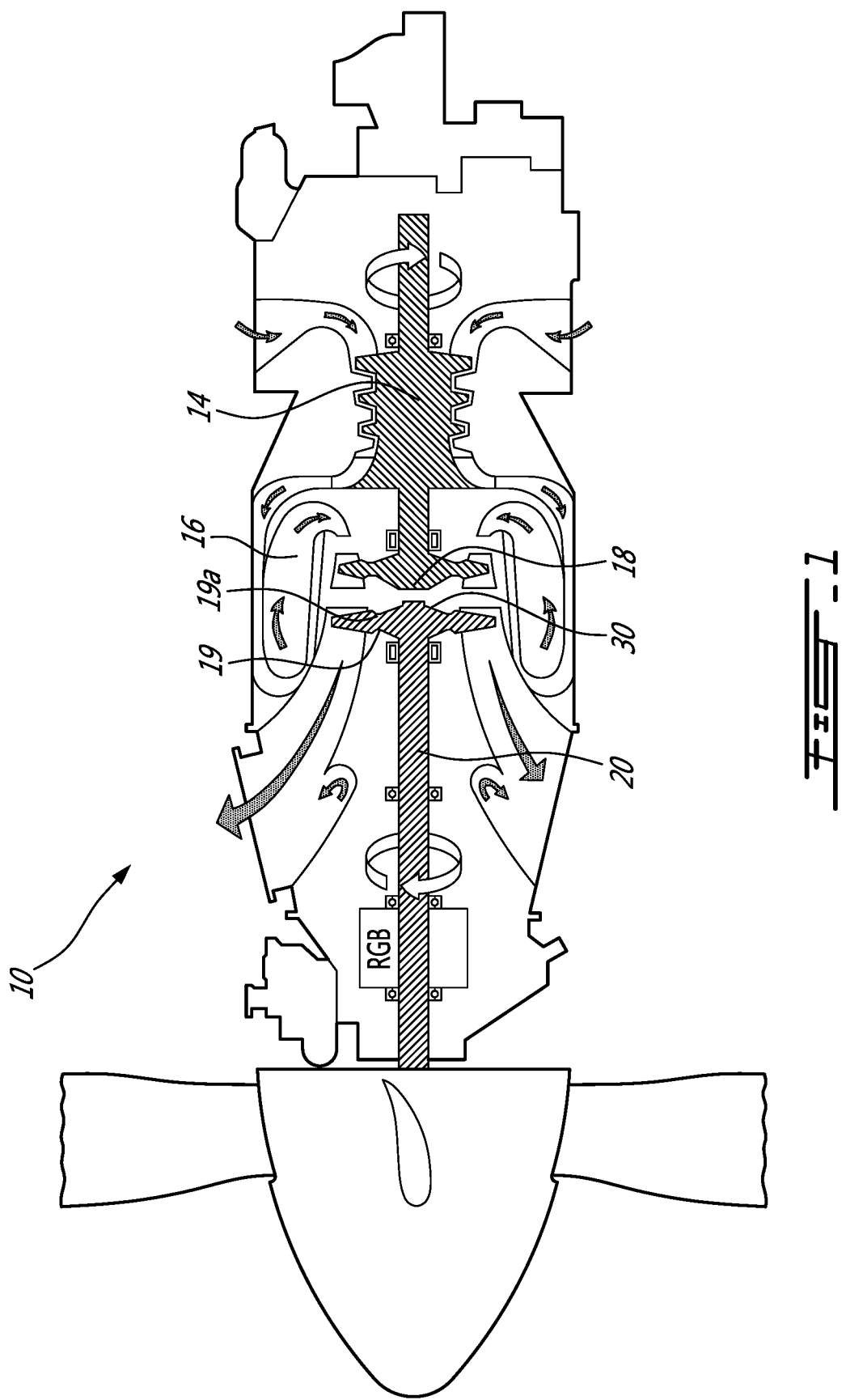
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a compressor turbine section 18 for extracting energy from the combustion gases. A power turbine shaft 20 supports a plurality of turbine rotors (one power turbine rotor 19 being shown).

Figure 2:
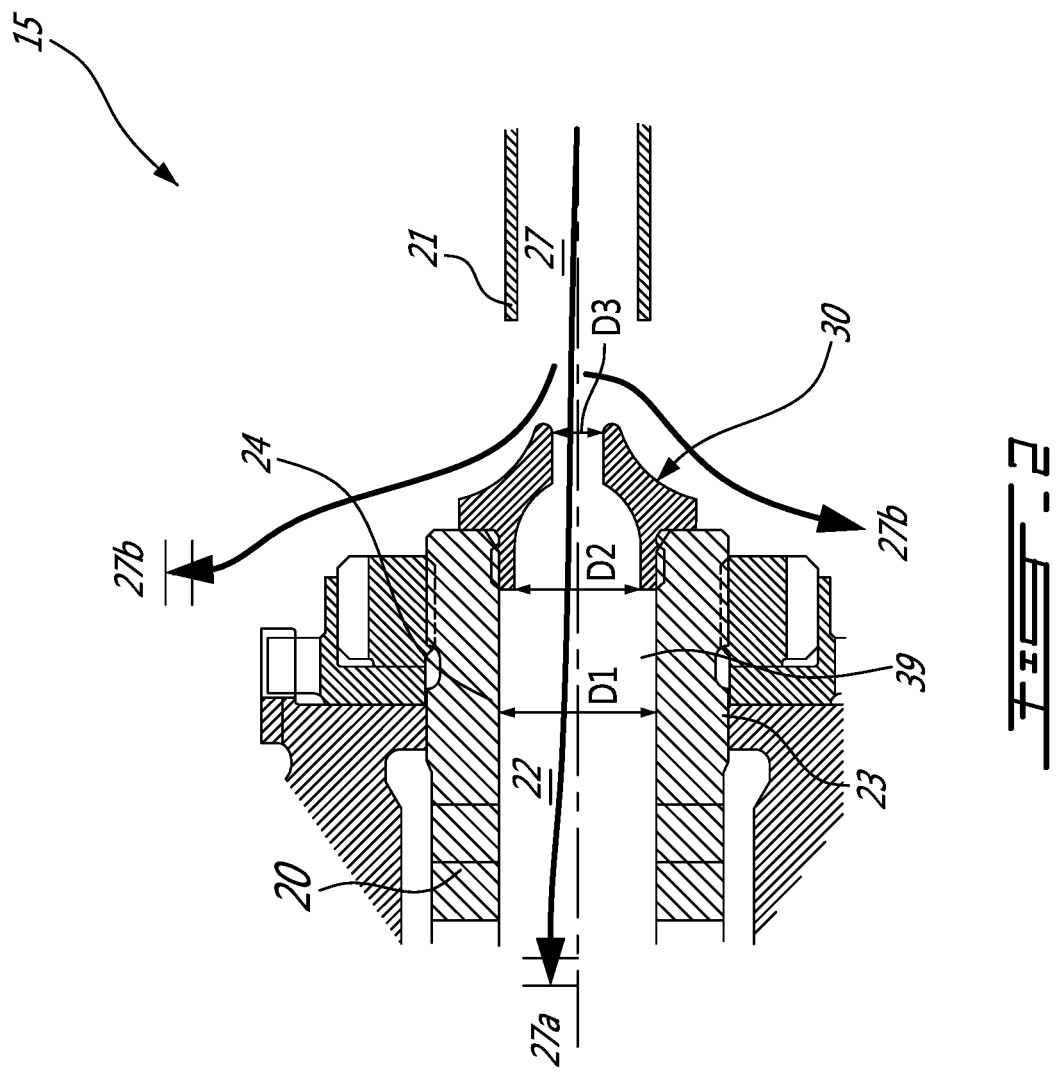
FIG. 2 is a schematic of a portion of the gas turbine engine of FIG. 1 located toward a turbine section shown with a first embodiment of a control plug for a hollow shaft of the turbine section.

Referring to FIG. 2, the power turbine shaft 20 is hollow and has a bore 22 extending therethrough. The bore 22 can be used to cool the shaft 20. The bore 22 has a diameter D1 constant throughout a length of the shaft 20. It is however contemplated that the bore 22 could have a variable diameter. An inlet end 23 of the shaft 20 facing a compressor turbine bolt 21 comprises a plug 30 (shown in a first embodiment) which controls an amount of fluid 27 flowing through the bore 22. In the embodiment described herein, the fluid flow 27 is cool air originating from a middle section of the compressor 14. The compressor turbine bolt 21 directs a first portion 27a of this relatively cool fluid flow 27 toward the bore 22 of the hollow shaft 20 so as to cool the shaft 20. The first portion 27a may not only to cool the shaft 20 but also cool the entire power turbine rotor 19 (including rotor blades and disc supporting the blades).

The plug 30 additionally deflects a second portion 27b of the incoming flow 27 away from the bore 22 and redirects it toward a hotter section of the compressor turbine section 18 also for cooling purposes. The flow 27 arriving from the compressor turbine bolt 21 has a relative high velocity of the flow 27, and majority of the flow 27 naturally becomes the first portion 27a flowing through the shaft 20. To counter this phenomenon, the plug 30 is designed to deflect the second portion 27b of the relative high velocity flow 27 radially away from the shaft 20 to cool an upstream face 19a of the turbine rotor 19.

Figure 3:
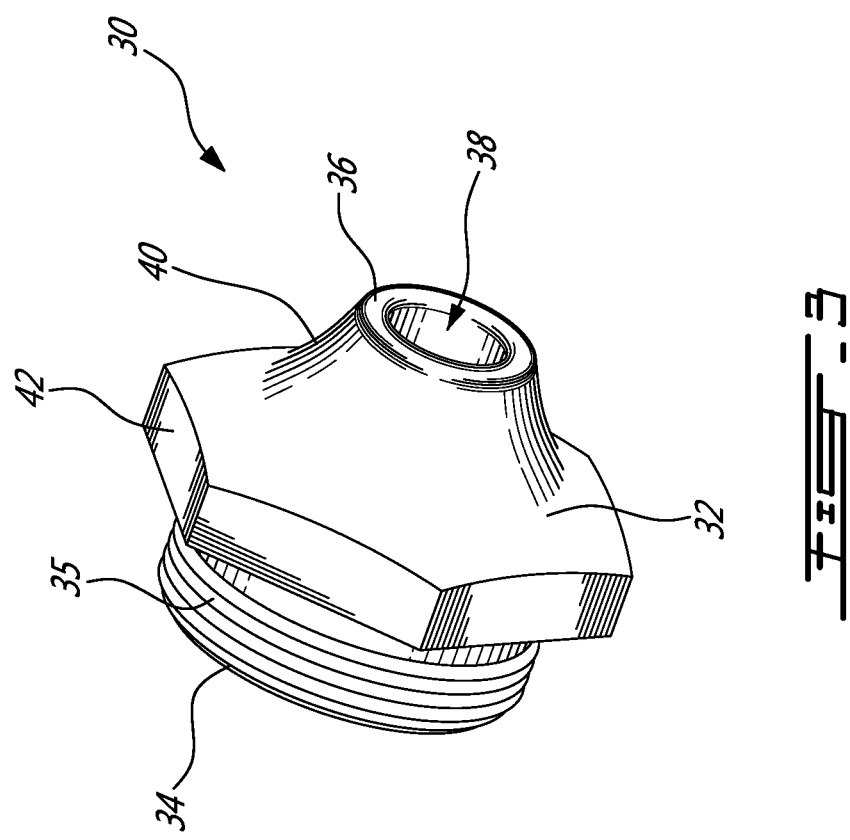
FIG. 3 is an isometric view of the control plug of FIG. 2.

Turning to FIG. 3, the plug 30 may include a unitary monolithic plug body 32 made of a material sustaining temperature typically found in that section of the gas turbine engine 10. It is contemplated that the plug 30 could be made of several connected parts. The plug body 32 includes a first end 34, a second end 36, and a bore 38 extending through the body 32 from the first end 34 to the second end 36. The second end 36 is an inlet end of the plug 30 relative to the fluid flow 27 and is adapted to face the compressor turbine bolt 21. As will be described below, a size of the inlet is determined to allow only a fraction of incoming fluid 27, i.e. first portion 27a, to flow through the shaft bore 22. The second end 36 has a rounded edge which allows a smoother contact with the incoming fluid 27. The first end 34 has threads 35 engageable with tapping 24 of an inside of the shaft 20 (best shown in FIG. 2) for securing the plug 30 onto the shaft 20. It is contemplated that the plug 30 could be threaded to an outside of the shaft 20. FIG. 4 shows a second embodiment of a plug 30' having similar characteristics to the plug 30 but connecting to the outside of the shaft 20 at threads 25'. In the embodiment shown in FIG. 4, the plug 30' is integrated with a turbine nut 26'. The turbine nut 26' retains the turbine disc 21 on the shaft 20. It is contemplated that the plug 30 could not have the threads 25 and be connected to the shaft 20 by other suitable means. The plug 30 could, for example, be welded to the shaft 20, force fitted, machined integrally within the shaft 20, brazed, axially retained by lugs and slots.

As best shown in FIG. 2, the bore 38 of the plug 30 may have a variable diameter. The bore has a diameter D2 at the first end 34 and a diameter D3 at the second end 36. The diameter D2 is larger than the diameter D3, yet the diameter D2 is smaller than the diameter D1 of the shaft 20. It is contemplated that the bore 38 could have a constant diameter. The bore 38 further includes a fairing portion 39 extending from the first end 34 toward the second end 36. The fairing portion 39 is designed to allow a smooth flow transition for the fluid 27a flowing from the second end 36 to the first end 34. It is contemplated that the fairing portion 39 could be omitted.

The plug 30 also includes a deflection surface 40 on an outer surface thereof. In the particular embodiment shown in the Figures, the deflection surface 40 is flaring and concave or frustroconical with the second end 36 centrally located, extending outwardly from the second end 36 toward the first end 34. The deflection surface 40 is adapted to deflect a portion of fluid 27, i.e. second portion 27b, away from the shaft bore 24. A shape of the deflection surface 40, and more specifically its curvature, is determined to direct the second portion 27b toward a predetermined location. In one embodiment, the deflection surface 40 has a curvature which deflects the second portion 27b of the incoming flow 27 toward a first disc of the compressor turbine section 18 disposed at proximity of a hot section. It is contemplated that the deflection surface 40 could be flaring yet not be concave. The deflection surface 40 could have any shape that may be optimised for directing a portion of a flow in a desired direction. The optimisation may depend on one or more of the following factors: proportion of incoming flow to deflect, velocity of the incoming flow, direction to deflect toward. It is also contemplated that the deflection surface 40 not be flaring at all. For example, the deflection surface 40 could be flat. The deflection surface 40 may include a plurality of grooves which may be designed to reduce swirl.

In the particular embodiment shown in the Figures, the plug 30 includes a grasping portion 42 disposed between the threads 25 and the deflection surface 10. The grasping portion 42 facilitates the manipulation of the plug 30 during threading and tightening of the plug 30 against the shaft 20. The grasping portion 42 has an hexagonal shape mating that of a wrench. It is contemplated that the grasping portion 42 could be omitted or could have a shape different from the one shown in the figures.

Turning now to FIG. 5, a method 50 of controlling the fluid flow 27 through the shaft 20 will now be described.

The method 50 starts at step 52 with allowing the first portion 27a of the incoming flow 27 through the second end 36 of the plug 30 connected to the shaft 20. In one embodiment, the first portion 27a is a predetermined amount of fluid in order to cool the shaft 20. To allow only a controlled portion, i.e. the first portion 27a, through the shaft 20, the plug 30 is disposed at the inlet end 23 of the shaft 20. By choosing a specific inlet diameter D3 of the plug 30, one may control the amount of fluid going through the shaft 20.

To determine D3, the minimum fluid flow 27a required to cool the hollow shaft 20 is first determined. Alternatively, one may set a determine a fluid flow other than the minimum fluid 27a required to cool the hollow shaft 20. For example, one may determine a fluid flow that exceeds by 10% the minimum fluid required to cool the hollow shaft 20. Once the fluid flow 27a is determined, a diameter corresponding to that fluid flow 27a is determined. That diameter is determined to be the diameter D3 corresponding to the plug 30 chosen to be fitted onto the shaft 20.

From step 52, the method 50 goes to step 54, where the second portion 27b of the incoming fluid 27 is deflected away from the shaft 20 by the deflection surface 40. In one embodiment, the second portion 27b is a predetermined amount of fluid in order to cool a portion of the engine 10 other than the shaft 20. The step 54 happens at the same time as the step 52. The deflection of the second portion 27b is enabled by the deflection surface 40 of the plug 30. The deflection surface 40 is shaped to orient the incoming flow 27 toward a desired component of the engine 10. While the choice of diameter D3 has been determined above in function of the required fluid flow 27a to cool the hollow shaft 20, it is contemplated that the choice of diameter D3 could be resulting from the choice of fluid flow 27b to cool a component other than the hollow shaft 20. In one embodiment, the choice of diameter D3 is a compromise between the required fluid flow 27a to cool the hollow shaft 20 and required fluid flow 27b to cool a component other than the hollow shaft 20.

Depending on the characteristics of the plug 30, the incoming flow 27 may be divided in more or less equal portion. In one embodiment, the first portion 27a represents 70% of the incoming flow 27, while the second portion 27b represents 30% of the incoming flow 27. Other proportions are contemplated. The plug 30 is designed to split the flow 27 into an amount allowing the shaft 20 and the power turbine rotor 19 to be cooled but also and deflect a remaining amount to the upstream face 19a of the power turbine rotor 19. This flow split is configured to optimize the cooling of various components of the power turbine rotor 19 (rotor blades, disc). In addition, this flow split is configured to optimize the pressures in the various cavities surrounding the disc, rotor blades and the vane (not shown) and to minimize possibilities of hot gas path ingestion into those cavities.

With the above plugs and method, the flow of cool air through the shaft is controlled. Only a minimum amount of air needed to cool the shaft can be directed to the shaft, while another portion of the cool air can be diverted to other components for cooling and pressure management. The plug is easily installable and its specification can be adapted to any shaft and environment of the shaft to ensure optimum air redistribution.

The above description is meant to be exemplary only, and one skilled in the art will recognize that changes may be made to the embodiments described without departing from the scope of the invention disclosed. For example, the plug could be adapted to hollow shafts of the gas turbine engine other than a turbine shaft. Still other modifications which fall within the scope of the present invention will be apparent to those skilled in the art, in light of a review of this disclosure, and such modifications are intended to fall within the appended claims.

The invention claimed is:

1. A plug for connecting to an end of a hollow shaft of a gas turbine engine, the plug comprising:

a plug body having a first end and a second end, the first end being connected to the hollow shaft during use;

a bore extending through the body from the first end to the second end, the first end having a first inner diameter larger than a second inner diameter of the second end; and a flaring deflection surface disposed on an outer surface of the plug body between the first end and the second end, the flaring deflection surface flaring from a tip of the second end to a widest portion of the plug.

2. The plug as defined in claim 1, wherein the first end of the plug is threaded on an outer surface thereof.

3. The plug as defined in claim 1, wherein the bore includes a fairing portion extending from the first end toward the second end.

4. The plug as defined in claim 1, further comprising a grasping portion disposed between the first end and the deflection surface.

5. The plug as defined in claim 4, further comprising the grasping portion is hexagonal.

6. The plug as defined in claim 4, wherein the grasping portion is the widest portion of the plug.

7. The plug as defined in claim 1, wherein the first end of the plug is threaded on an internal surface thereof.

8. The plug according to claim 1, wherein the flaring deflection surface has a curvature extending from the tip to the widest portion.

9. A plug for connecting to an end of a hollow shaft of a gas turbine engine, the plug comprising:

a plug body having a first end and a second end, the first end being connected to the hollow shaft during use;

a bore extending through the body from the first end to the second end, the first end having a first inner diameter larger than a second inner diameter of the second end; and a flaring deflection surface disposed on an outer surface of the plug body between the first end and the second end, the flaring deflection surface only flaring from a tip of the second end to a widest portion of the plug.

* * * * *